Sept. 12, 1967 G. E. HOUGHTON ET AL 3,341,211
PACKING RINGS AND METHOD OF MAKING THEM
Filed April 1, 1963 2 Sheets-Sheet 1

INVENTORS:
GEORGE E. HOUGHTON
BY EDWARD J. MESSENGER

Robert H. Henderson

ATTORNEY

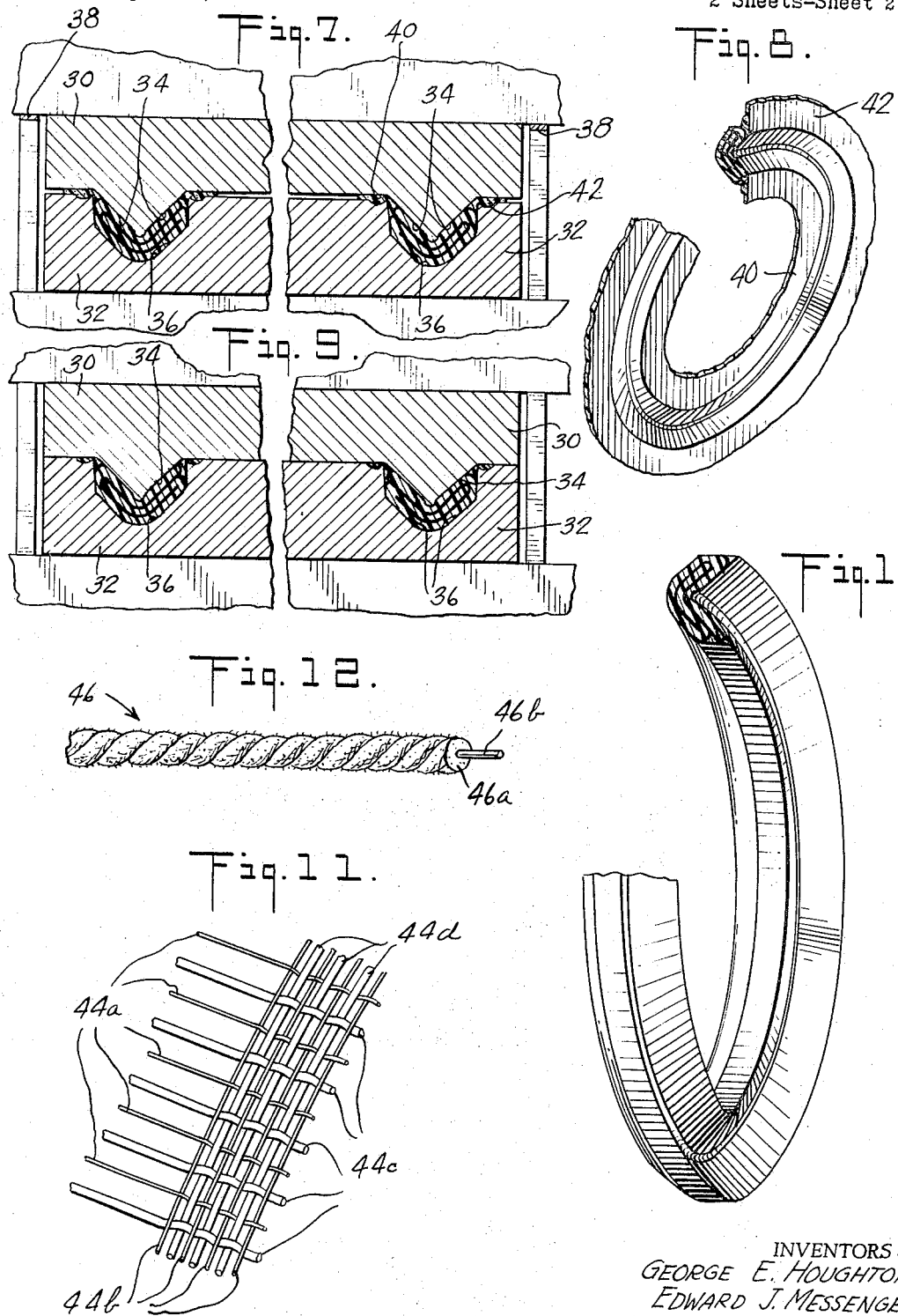

United States Patent Office 3,341,211
Patented Sept. 12, 1967

3,341,211
PACKING RINGS AND METHOD OF
MAKING THEM
George E. Houghton, Palmyra, and Edward J. Messenger,
Fairport, N.Y., assignors to Garlock Inc., Palmyra,
N.Y., a corporation of New York
Filed Apr. 1, 1963, Ser. No. 269,481
5 Claims. (Cl. 277—205)

This invention relates to improved packing rings for packing a reciprocating rod or like machine element against leakage of fluid therealong. More particularly, it comprehends packing rings of uniform circumferential continuity and high resistance to heat, to frictional wear, to extrusion from its packing space, and to attack by corrosive fluids.

An important object of this invention is the provision of an improved packing ring for a reciprocating machine element which ring possesses one or more of certain characteristics, to wit; greater strength and resistance to extrusion, greater resistance to leakage of fluid therethrough, reduced heat generation in use, greater heat resistance, and greater capacity to carry off generated heat.

Another important object is the provision of such a packing ring of uniform, structural, circumferential continuity, to eliminate weakness and leakage paths which often arise at a splice, when a non-continuous length of material is spliced end-to-end to form a ring, and to make the packing ring of substantially uniform strength and imperviousness at all points therearound.

Another important object is the provision of such a packing ring comprising, as its principal constituents, substantial parts of both asbestos textile material and sintered tetrafluoroethylene, or somewhat similar material possessing, to a substantial degree, the characteristics of tetrafluoroethylene and the possibility of manufacture and utilization in the manner and with results as hereinafter set forth. The term "textile" is used herein with reference to material which is or may be woven, knitted or braided. Also, for convenience, the trade name "Teflon," of tetrafluoroethylene, is used broadly herein to refer to tetrafluoroethylene and to any above-indicated, somewhat similar material.

Another important object is the provision of a packing ring of which a substantial constituent is Teflon, to derive the advantages of the low friction characteristic of Teflon, but which avoids Teflon's tendency toward cold flow and the substantial expansion which Teflon undergoes under elevated temperature conditions.

Another important object is the provision of metallic means in such a ring aiding in the formation of the ring, for opposing extrusion of the material of the ring from a stuffing box and for aiding in the dispersion of generated heat.

The stated objects are derived, according to the broader aspects of this invention, by providing a continuous ring of open mesh, asbestos textile having a fold or folds giving the ring plural plies and its approximate desired cross-sectional shape, the textile being impregnated and more or less embedded in sintered Teflon, and the impregnated ring being molded to its desired final shape as when it is ready for use.

For illustrative purposes, the accompanying drawings show a preferred embodiment of the invention and several variations thereof.

In the drawings:

FIGURE 1 is a perspective view of a tubular blank of single ply, open mesh, woven, asbestos textile which is employed in the making of a packing ring according to this invention, the interlacing of the strands of the blank being circumferentially continuous, thereby giving the blank its single ply, tubular characteristics. All references in this specification and in the following claims to a ring or blank which is "continuous" are intended to mean that the ring or blank is continuous, as shown in FIG. 1, in that the interlacing of the textile's strands is continuous around the ring, thereby avoiding the existence of any overlapping, abutting, splicing or cementing of ends of textile material to give the latter the form of a ring.

FIG. 7 is a sectional view showing the partially everted blank of FIG. 6 (Teflon impregnated and coated as hereinafter described), pressed almost to its final shape in a set of relatively cold dies, barred to prevent them from fully closing.

FIG. 8 is a perspective view of the compacted Teflon impregnated and coated blank, as upon removal from the barred dies and prior to being heated to the sintering temperature of the Teflon.

FIG. 9 is a view of the sintered blank finally compressed within unbarred dies giving the blank its final shape and dimensions, these dies being the same or closely similar to the dies used in initially compacting the blank.

FIG. 10 is a perspective view, partly broken away, of the packing ring as completed, ready for use.

FIG. 11 is a view of the same general character as FIG. 2, but showing wire interwoven with asbestos in a textile blank which may be employed in a modification of this invention.

FIG. 12 is an enlarged view of a wire-based, asbestos strand which may be employed in a further modification of this invention.

In the illustrated preferred manner of practicing this invention, a tubular blank 20 of single ply textile consisting substantially of asbestos is formed or is cut from relatively long tubular textile stock. The blank or the tubular stock from which it may be cut may be made in tubular form on, for example, a so-called "bag-loom." The dimension of the tubular blank should be such that, when folded and formed as hereinafter explained, it will be approximately of a desired shape and size.

Figure 1:
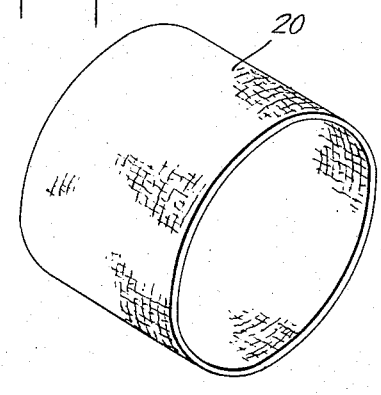
Figure 2:
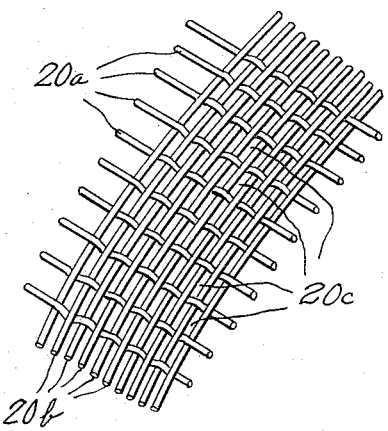
FIG. 2 is an enlarged view of a portion of the textile shown in FIG. 1, showing the preferred open texture thereof.

The strands of the textile may be interlaced by being braided, knitted, or woven. In the illustrated preferred form, the blank 20 is of woven material in which, as best shown in FIG. 2, the weave is relatively loose or open. There is an advantage in having the warp strands 20a, in particular, spaced substantially apart, as in FIG. 2, to facilitate folding of the blank, in the manner hereinafter explained, with little or no wrinkling or puckering. The weft strands 20b may be closer together than the warp strands but, nevertheless, spaced apart sufficiently to provide interstices 20c of substantial size to receive Teflon therein as hereinafter explained.

The strands 20a, 20b may be solely of twisted asbestos fibres, but they may advantageously include cotton and/ or rayon fibres or the like, intermingled with the asbestos fibres, to strengthen the strands and facilitate weaving thereof.

In making a packing ring, the blank 20 is folded circumferentially to cause one or both ends to sleeve over or into the remainder of the blank to convert it into a plural-ply ring. More particularly, one end of the blank may be sleeved over the remainder or first ply 22a of the blank to form a second ply 22b as in FIG. 3, whereafter the blank's other end may be sleeved over ply 22b to form a third ply 22c as in FIG. 4.

Figure 4:
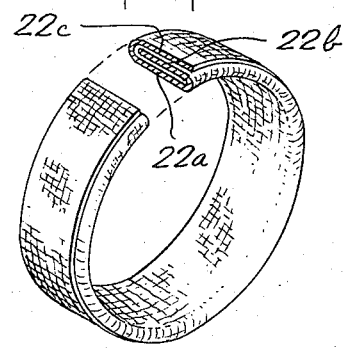
FIG. 4 is a perspective view, partly broken away, illustrating a second marginal fold given to the blank in a preferred manner of making the packing ring.
Figure 5:
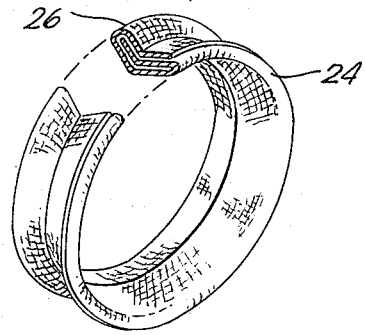
FIG. 5 is a perspective view, partly broken away, illustrating an outwardly facing circumferential groove giving the folded blank the form of a shallow V or modified U in cross-section.

The plural-ply ring blank, that shown, for example, in FIG. 4, is then, by any suitable means, deformed to a relatively flat V or modified U shape in cross-section as shown in FIG. 5; the outside angle of the V or convex portion of the U facing radially inwardly and the inside angle of the V or concave portion of the U facing radially outwardly.

Figure 6:
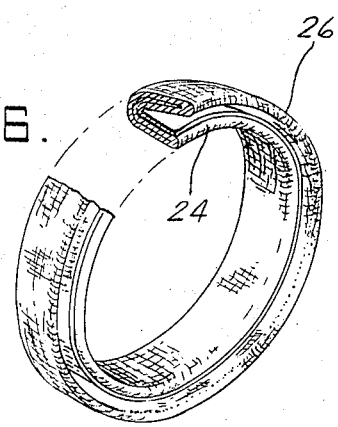
FIG. 6 is a perspective view, partly broken away, illustrating a changed form given to the blank of FIG. 5 by twisting or partially everting the latter about a circumferential line to cause the previously mentioned groove to face in an axial direction.

The V or U shaped ring blank is then partially everted, by being turned or twisted about a circumferential line thereof, from its FIG. 5 shape to its FIG. 6 shape in which the inside and outside angles of the V or the concave and convex portions of the U face in opposite axial directions. The thus partially everted blank is sometimes herein referred to, for convenience, merely as the "everted blank." This eversion of the blank gives it a sectional shape more in the nature of a U or a modified V; and, for convenience, reference hereinafter to a V-shaped ring shall be understood to be inclusive of a U-shaped ring.

It may be observed that the everting deformation of the ring blank from its FIG. 5 condition to its FIG. 6 condition has the effect of constricting or shortening an edge 24 of the blank and/or extending or lengthening an edge 26 of the blank. It will be understood that the open texture of the textile or, more particularly, the mentioned substantial spacing between the warp strands 20, enables the latter strands to crowd together at the inner margin of the everted blank to avoid material puckering or wrinkling of the blank.

It should also be noted that the ring blank, before eversion, may be formed with the inside angle of the V or the concave portion of the U facing radially inwardly rather than outwardly. In either situation, eversion will bring the ring to its FIG. 6 shape.

The asbestos blank, numbered 28 in its final shape as in FIG. 6, is then substantially impregnated with unsintered Teflon by immersing it in a suitable bath of Teflon suspensoid. A single immersion or dipping may suffice but such dipping may be repeated to the extent necessary to carry a desired quantity of Teflon into the interstices of the blank and to lightly coat the blank. Although the proportion of asbestos and Teflon in a finished packing ring within this invention is not critical, it has been found that a finished ring having about equal parts of asbestos and Teflon is highly satisfactory.

After removal of the adequately Teflon impregnated blank 28 from the suspensoid, and after the blank has been substantially dried, the blank is placed in and between relatively cool annular mold elements 30 and 32 (FIG. 7) having blank-shaping surfaces 34 and 36 conforming substantially to the desired final shape of the packing ring being manufactured. These mold elements are considered to be cool in the sense that they are at a temperature substantially below the sintering temperature of Teflon. This cool mold assembly, barred against complete closing by suitable thin bar members 38, is closed at high pressure upon the blank to the extent permitted by said bar members, thereby squeezing excess Teflon from the blank and compacting and shaping the latter almost to its final shape and dimensions.

The blank, upon being removed from the cool mold assembly, is as shown in FIG. 8 with internal and external flash portions 40 and 42 which are then cut away by any suitable trimming means leaving the blank approximately in its final shape, but slightly oversize.

The cold-formed, Teflon-impregnated and coated, trimmed blank ring is then suitably sintered as, for example, in a suitable sintering oven, by subjecting the blank to the sintering temperature of Teflon (between 625° F. and 725° F.) for a period of time sufficient to insure sintering of all Teflon within the blank; this period of time in most instances being from ten minutes to twenty minutes depending upon the cross-sectional thickness of the ring.

During the mentioned sintering, the wetting agent employed in the Teflon suspensoid is being discharged from the ring as gas, and any cotton and/or rayon fibres or other fibrous strengthening material, which may have been used with asbestos fibres in the strands, are fully carbonized.

Upon termination of the indicated period of sintering, the ring is further and finally compacted to close all voids that may have been left by the mentioned discharge of wetting agent and by the burning out of the cotton and/or rayon or other fibrous strand strengthening media. For that purpose, the sintered ring is transferred qucikly (preferably within ten seconds), while still at Teflon-sintering temperature, to a coining mold assembly, preheated to about 300° F., wherein the ring is further compressed and held compressed while its temperature drops to a point substantially below the Teflon's sintering temperature and to a point where the ring will have substantial dimensional stability; i.e., the temperature drop should be at least to about 400° F. The duration of the indicated pressure-maintenance and temperature drop is usually about two minutes except with extreme-size packing rings.

The sintered ring is shown in FIG. 9 as in the same mold assembly for final pressing as was employed in cold forming the Teflon-filled blank. In practice, of course, it may be more convenient to use separate mold assemblies for cold forming the ring and for subsequently finally pressing and keeping it under pressure during its temperature drop from sintering temperature.

If the same mold assembly is used for the two mentioned purposes, the bar members 38 are omitted for final pressing to permit the assembly to close completely and thereby accomplish the further, final compacting of the ring.

If a different mold assembly is employed for final compacting, its ring-forming surfaces should be shaped substantially the same as those of the cold-forming mold elements but should close to a somewhat smaller cross-sectional area than the latter mold elements. In any event, the mold assembly employed for final pressing should be preheated as hereinbefore indicated.

The packing ring, upon removal from the coining dies, and after trimming away of any further flash portions that may have formed, is in final form as illustrated in FIG. 10 and is ready for use. This ring is capable of withstanding relatively high operating temperatures; up to about 550° F. Moreover, it substantially retains the low friction characteristic of Teflon and, unlike Teflon alone, does not undergo excessive swelling at elevated operating temperatures, which swelling, objectionably, causes increased gripping of the ring upon a rod or shaft working therein with consequent increased friction, increased heat, and increased power loss. Additionally, the presence of the asbestos textile in the ring substantially obviates cold flow and extrusion of Teflon from a stuffing box within which the ring is disposed, conditions which are objectionably present when packing rings of Teflon alone are employed.

Figure 3:
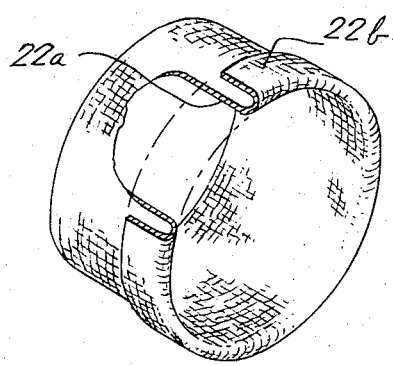
FIG. 3 is a perspective view, partly broken away, illustrating a first marginal fold given to the blank in a preferred manner of making the packing ring.

In an alternative way of making a packing ring according to this invention, the textile ring can be immersed in the bath of Teflon suspensoid at some time prior to the indicated eversion as, for example, immediately after formation of the cylindrical blank 20 or at different stages in the deformation of said blank, which stages are shown in FIGS. 3, 4, and 5. While complete impregnation or filling of the textile can be accomplished at any one of several stages, impregnation can be done at two or more stages. Thus, a first immersion giving partial impregnation may be effected in the cylindrical ring 20, giving the latter substantial body to facilitate folding, and further immersion to complete impregnation to the desired degree may be effected after folding of the blank has been completed.

An alternative composition of textile employed in a packing ring according to this invention may advantageously include (as shown in FIG. 11), warp wires 44a and weft wires 44b interwoven with asbestos warp and weft strands 44c and 44d.

Another way of utilizing wires in the textile is to have strands 46 wherein, as shown in FIG. 12, fibrous, stranded asbestos 46a is twisted or entwined around wire 46b, these wire-asbestos strands being interwoven, to form the textile, similarly to the interweaving of strands 20a and 20b shown in FIG. 2.

It is recommended that wire employed in practicing this invention be of brass or copper, although wire of other metals may be employed with some advantage.

The indicated inclusion of wire in the textile contributes substantial reinforcement to the textile to strongly oppose extrusion of any portion of the packing ring from the packing space within which it is retained; hence, it enables the packing to function effectively in the presence of relatively high pressure of sealed fluid.

Wire in the textile also facilitates carrying-off of heat from the packing ring to intimately surrounding machine casing parts, thereby enabling the packing to be employed satisfactorily under more elevated heat conditions than in the absence of wire.

Wire in the textile also gives greater stability or support to the latter, thereby facilitating the described folding and deformation of the textile in forming the packing ring.

We claim:
1. A packing ring of V-shape in radial section with the recess of the V facing axially of the ring; said ring comprising an annulus which is of textile material of intertwined strands including asbestos and has an impregnation of sintered Teflon; said textile material extending in approximate parallelism with inner and outer surfaces of the packing ring; and said annulus being circumferentially uniform and continuous in that, at all circumferential areas, said strands are similarly disposed with reference to a circumferential line of the ring, and circumferentially extending strands in each of said areas are continuous with reference to circumferentially extending strands in adjacent areas.

2. A packing ring according to claim 1, said textile material of the annulus being woven.

3. A packing ring according to claim 1, said textile material of the annulus having opposite, inwardly folded side marginal portions, the edges of the textile being inward of edges of the annulus in the latter's folded condition.

4. A packing ring according to claim 3, said inwardly folded portions being in overlapping relation to each other and to a central circumferential portion of the annulus to constitute the latter of three textile plies.

5. A packing ring according to claim 1, the textile of the annulus comprising strands formed of asbestos entwined about wire.

References Cited

UNITED STATES PATENTS

| | | | |
|---|---|---|---|
| 73,454 | 1/1868 | Miller | 277—230 X |
| 1,020,115 | 3/1912 | Price | 277—230 |
| 1,246,089 | 11/1917 | Greenoe | 277—124 |
| 1,321,930 | 11/1919 | McClure | 277—230 X |
| 2,139,541 | 12/1938 | Farnsworth. | |
| 2,268,703 | 1/1942 | Dickey | 264—136 |
| 2,517,090 | 8/1950 | Denning | 264—136 |
| 2,525,747 | 10/1950 | Hess | 277—124 |
| 2,539,329 | 1/1951 | Sanders | 117—65 |
| 2,665,151 | 1/1954 | Fisher et al. | 277—124 |
| 2,891,921 | 6/1959 | Kumnick et al. | 260—29.6 |
| 2,892,650 | 6/1959 | Runton | 277—227 X |
| 2,969,997 | 1/1961 | Runton et al. | 277—227 X |
| 3,092,509 | 6/1963 | Booth et al. | 117—126 |
| 3,097,990 | 7/1963 | Holly | 162—135 |
| 3,120,960 | 2/1964 | Pippert et al. | 277—230 |
| 3,193,437 | 7/1965 | Schafer | 156—245 X |
| 3,231,460 | 1/1966 | Andrews | 161—189 |

LAVERNE D. GEIGER, *Primary Examiner.*

J. S. MEDNICK, *Assistant Examiner.*